United States Patent [19]

Ramirez

[11] Patent Number: 5,539,901

[45] Date of Patent: Jul. 23, 1996

[54] METHOD AND APPARATUS FOR SYSTEM MANAGEMENT MODE SUPPORT FOR IN-CIRCUIT EMULATORS

[75] Inventor: Jose Ramirez, Aloha, Oreg.

[73] Assignee: Intel Corporation, Santa Clara, Calif.

[21] Appl. No.: 375,515

[22] Filed: Jan. 18, 1995

Related U.S. Application Data

[63] Continuation of Ser. No. 130,115, Sep. 30, 1993, abandoned.

[51] Int. Cl.[6] .................................................. G06F 11/00
[52] U.S. Cl. ............................ 395/500; 364/DIG. 1; 364/DIG. 2; 364/264; 364/264.3; 364/948.2; 364/948.8
[58] Field of Search .................... 364/DIG. 1 MS File, 364/DIG. 2 MS File, 514 A, 530, 800, 801, 578; 395/500, 750

[56] References Cited

U.S. PATENT DOCUMENTS

| | | | |
|---|---|---|---|
| 4,631,701 | 12/1986 | Kappeler et al. | 395/425 |
| 4,789,924 | 12/1988 | Fukuta | 371/16.2 |
| 4,860,247 | 8/1989 | Uchida et al. | 395/153 |
| 4,903,218 | 2/1990 | Longo et al. | 395/157 |
| 4,937,036 | 6/1990 | Beard et al. | 345/156 |
| 4,958,303 | 9/1990 | Assarpour et al. | 395/163 |
| 4,989,207 | 1/1991 | Polstra | 371/16.2 |
| 4,993,027 | 2/1991 | McGraw et al. | 371/16.2 |
| 5,053,949 | 10/1991 | Allison et al. | 395/375 |
| 5,056,033 | 10/1991 | Hill | 364/483 |
| 5,072,412 | 12/1991 | Henderson, Jr. et al. | 395/159 |
| 5,119,319 | 6/1992 | Tanenbaum | 364/514 A |
| 5,132,971 | 7/1992 | Oguma et al. | 371/16.2 |
| 5,202,976 | 4/1993 | Hansen et al. | 395/500 |
| 5,228,039 | 7/1993 | Knoke et al. | 371/19 |
| 5,239,642 | 8/1993 | Gutierrez et al. | 395/425 |
| 5,313,618 | 5/1994 | Pawloski | 395/500 |
| 5,392,420 | 2/1995 | Balmer et al. | 395/500 |

*Primary Examiner*—Robert B. Harrell
*Attorney, Agent, or Firm*—Blakely, Sokoloff, Taylor & Zafman

[57] ABSTRACT

An in-circuit emulation unit with a probe implemented on a microprocessor whilst in emulation upon entering or leaving system management mode. The present invention is used on a microprocessor in a target computer system. The present invention offers the ability to implement a capability where a user could access emulation information while a system is in or out of system management mode. The present invention provides a better way of controlling a target computer system when in system management mode thereby allowing user access to special system management code, processor contents, processor registers and system state variables necessary for debug and design of system management features available on todays laptop and desktop computers.

9 Claims, 5 Drawing Sheets

METHOD AND APPARATUS FOR SYSTEM MANAGEMENT MODE SUPPORT FOR IN-CIRCUIT EMULATORS

This is a continuation of application Ser. No. 08/130,115, filed Sep. 30, 1993.

BACKGROUND OF THE INVENTION

1. Field of the Invention

The present invention relates generally to the field of computer systems.

More specifically, the present invention relates to the field of computer systems where an in-circuit emulator is able to emulate the microprocessor of the target computer system in a System Management Mode.

2. Prior Art

In a typical prior art system such as the one illustrated in FIG. 1, an In-Circuit Emulator (ICE) is able to emulate a microprocessor as the microprocessor operates in a System Management Mode (SMM). SMM is a state when the microprocessor is able to manage various system resources such as memory, power supply, etc. in order to control the availability of these resources. SMM also allows the shutdown of a Central Processing Unit (CPU) and system peripherals such as disk drives, keyboards, or display monitors with the option of restarting the system transparently to the system or application software. SMM is a well known feature of microprocessors such as the Intel I486SL™ brand microprocessor developed by Intel Corporation.

SMM also allows the transparent emulation of the system peripherals and provides the hooks or access interfaces for external power management mechanisms such as peripheral activity monitoring (i.e timers), which signal when a peripheral has not been accessed for a predetermined programmed length of time. The operation and use of SMM is well known to those of ordinary skill in the art.

In a typical prior art emulation system, a host computer is used with an emulator to emulate a microprocessor under test. When an instruction is issued from the host computer, via a communication bus to a control processor instructing the emulator to begin emulation, the control processor begins monitoring the microprocessor under test. A message sent from the host computer to the emulator can be used to determine the status or mode of operation of the microprocessor under test.

One of the problems with prior art emulation systems is that when the microprocessor being emulated is in SMM and the microprocessor powers down as normally done, the emulator detects the inactivity of the microprocessor under test as a failure, which may not necessarily be the case.

Another problem and disadvantage of prior art systems is that when the microprocessor under test is in SMM, the user has no means of interrupting the emulation of the microprocessor under test to debug the operation of the system under SMM itself. This means that once a microprocessor under test goes into SMM emulation, it cannot be interrupted until emulation in SMM is completed. After completion of emulation, the user is unable to trace problems that might have occurred while the system was in emulation.

To avoid the loss of data due to power down events and to effectively utilize the SMM capabilities of the microprocessor, an in-circuit emulator design is needed to emulate the host computer when the system under test is in SMM so as not to lose any data while running the test. In addition, an emulator design is needed to enable recovery from a SMM suspend mode and the resumption of execution of the system under test at a location where the system was executing before a power down.

SUMMARY OF THE INVENTION

The present invention provides an improved method and apparatus for the debugging of system hardware and software designs using SMM. A primary feature of a microprocessor like the i486SI™ brand microprocessor manufactured by Intel Corporation is the ability to enable a computer system to operate in SMM. This feature allows a laptop, desktop, or PC system to control key components of the system in use such as harddrives, keyboards and video. By controlling these key components, the battery life of the computer is preserved due to the reduction in power consumption. Intel, i486™, and i486SL™ are trademarks of Intel Corporation.

The present invention addresses an inherent problem with the SMM feature of a target microprocessor system (i.e a microprocessor under test). Because power management of the target system is key to the success of the to implementing SMM, the battery life of the target system is of primary concern. Prior art systems have been unable to emulate a target system operating in SMM.

The present invention therefore provides an apparatus and method for the user to emulate through SMM software and allow real-time user access to SMM processing and status information. The ICE of the present invention comprises of a Break Trace Board (BTB) which provides signals for a print utility on the ICE and a Control Processor Board (CPB). The BTB couples to CPB via a data and address bus.

The CPB has control processor firmware (CPF), a dual-ported Random Access Memory (RAM), a Control Processor (CP) such as the 80188 brand processor manufactured by Intel Corporation, Pass Through Monitor firmware (PTM) which is loaded into and executed from the dual-ported (RAM). The CPB also has other components coupled to the data, address and control buses on the board which are not necessary to the understanding of the present invention.

The CP firmware is coupled to an address and data bus which also couples to the CP. The CP firmware executed by the CP checks to see if the system has entered an emulation mode, monitors bus activity, and performs a series of checks to determine various functional stages of the target system while in SMM.

The present invention further comprises an In-Circuit Emulator Probe (ICEP) which comprises a microprocessor such as the i486SL™ brand microprocessor and Autobreak logic, both coupled to an internal bus which is a bus only accessible by the ICE hardware. The microprocessor is coupled to an address and data bus which is coupled to the dual-ported RAM and PTM firmware on the CPB of ICE. The Autobreak logic of the ICEP is coupled to the control bus which couples to the Autobreak Control logic of the CPB.

DETAILED DESCRIPTION OF THE INVENTION

A method and apparatus for the improved emulation of a microprocessor system having a System Management Mode is described. The present invention addresses system emulation control problems encountered as a result of the System Management Mode capability of microprocessors which allows the system to handle power down and suspend events. The present invention allows a user to enter a command that enables the debugging of system and software designs of a target system under test using System Management Mode.

Figure 1:
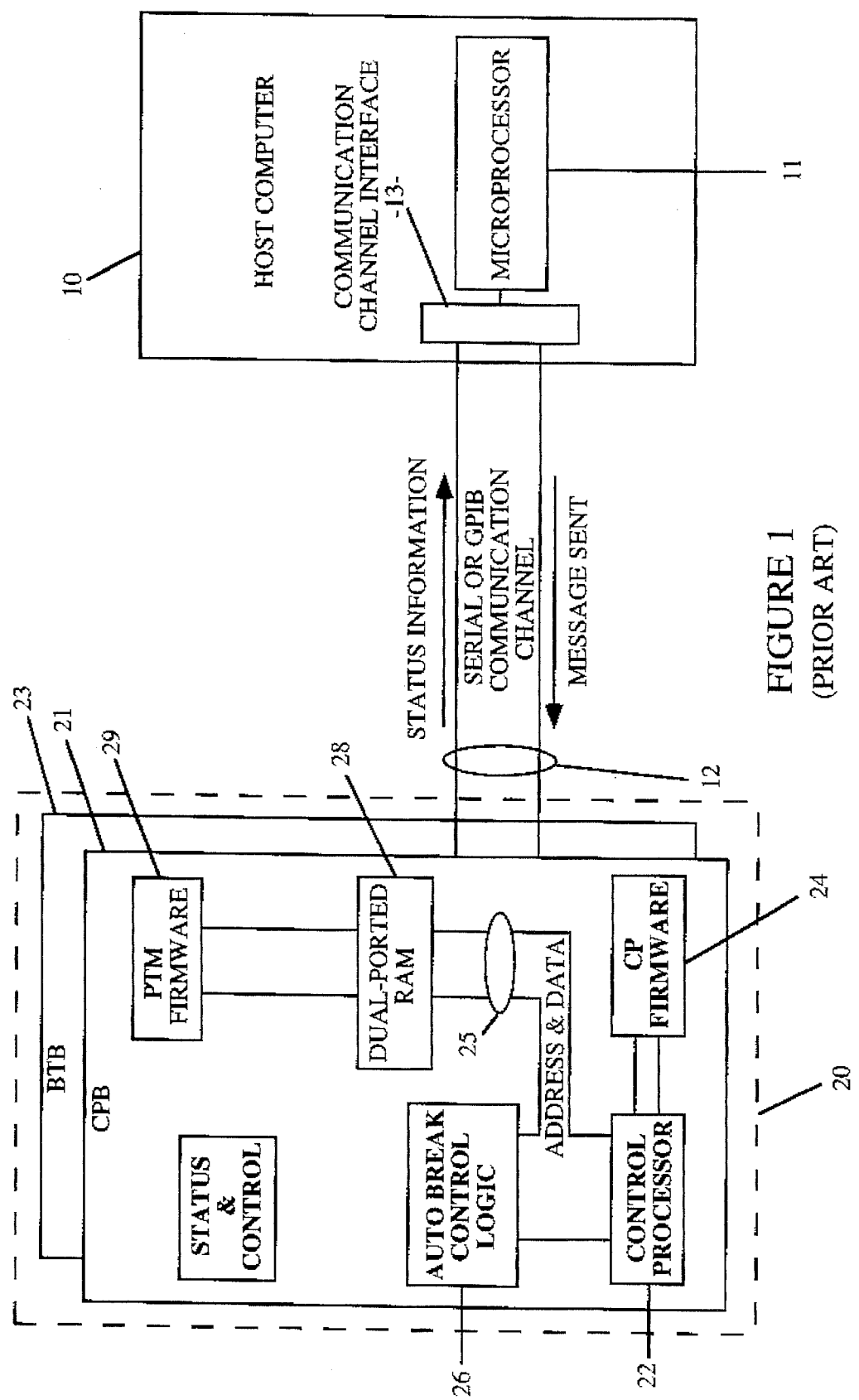
FIG. 1 is a drawing of a prior art system comprising a host computer with an in-circuit emulator.

The following description, for purposes of explanation, has specific circuit devices, circuit architectures and components and are set forth in order to provide a more thorough understanding of the present invention. However, it will be apparent to one of ordinary skill in the art that the present invention may be practiced without the specific details.
Overall Design of the Preferred Embodiment of the Present Invention FIG. 1 illustrates a prior art system having a host computer 10 that provides and performs user functions, a serial or a General Purpose Interface Board communication channel (GPIB) 12 that is coupled to host computer 10 for transmitting data and address signals between host computer 10 and an in-circuit emulator, an In-Circuit Emulator (ICE)20 coupled to the serial or GPIB communication channel 12 that provides hardware and software debugging capabilities necessary for the user in debugging new hardware and software for Personal Computer (PC) systems or embedded designs. ICE 20 also provides capabilities to the user in designing and debugging existing system and software designs. Host computer 10 also comprises a communication channel interface 13 for connecting the host computer 10 with communication channel 12 and a microprocessor 11 coupled to the communication interface 13, which is utilized in processing all the instructions and data in the host computer 10.

ICE 20 includes a Control Processor (CP) 22 to which Control Processing Firmware (CPF) 24 is coupled. CP 22 and CPF 24 are coupled via address and data bus 25 to autobreak control logic 26 and dual ported Random Access Memory (RAM) 28. Pass Through Monitor (PTM) firmware 29 is coupled to dual ported RAM 28.

ICE 20 comprises a Break Trace Board (BTB) 23 and a Control Processor Board (CPB) 21. BTB 23 is coupled to CPB 21 via an address and data bus (not shown) which is well known to those of ordinary skill in the art.

Figure 2:
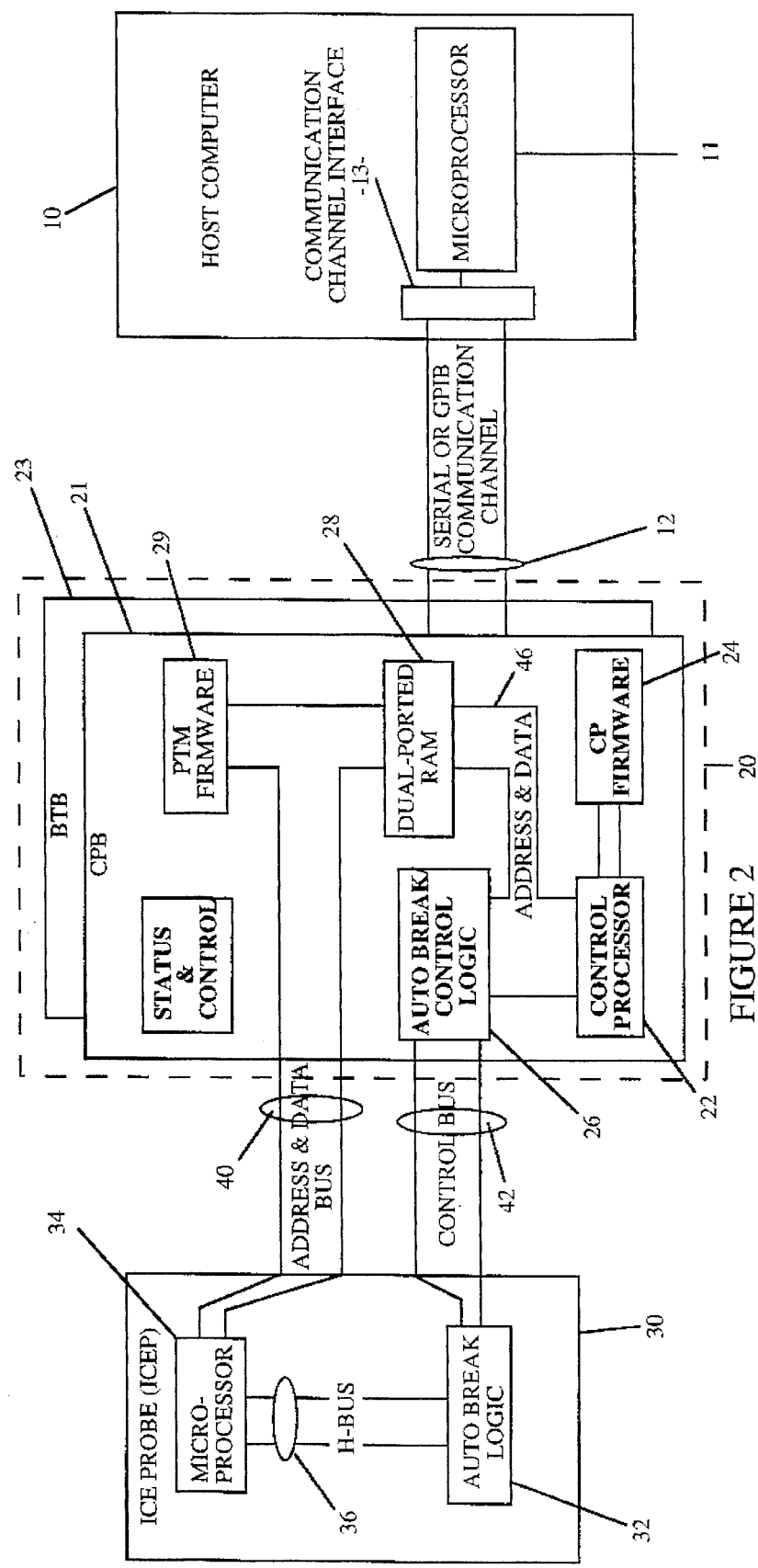
FIG. 2 is a general block diagram of the preferred embodiment of the present inventions.

Referring now to FIG. 2, a computer system employing the teachings of the present invention is illustrated. A host computer 10 is shown coupled to a communication bus 12. A host microprocessor 11 is also shown resident within host computer 10 coupled to a system bus (not shown). In-Circuit Emulator unit (ICE) 20 is shown also coupled to communication bus 12. ICE 20 includes conventional components (not shown) which contain internal registers mapped in a well known manner to an Input/Output (I/O) address on bus 12.

ICE 20 comprises a Control Processor Board (CPB) 21 and a Break Trace Board (BTB) 23. CPB 21 is coupled to BTB 23 via a data and address bus (not shown) in a conventional manner. As illustrated in FIG. 1, ICE 20 being partitioned into a CPB 21 and a BTB 23 is well known to those of ordinary skill in the art.

ICE 20 is also coupled to In-Circuit Emulator Probe unit (ICEP) 30 via an address and data bus 40 and a control bus 42. The ICEP 30 includes conventional components (not shown) whose internal registers are also mapped in a well known manner to I/O address spaces on bus 40. ICEMODE is a mode provided in a version of a chip similar to the Intel i486SL™ brand microprocessor which allows non-restricted access to aH the microprocessor's internal register and protected mode code, and Autobreak Control logic. The ICE 20 of the present invention includes Control Processing firmware (CPF) 24. This Control Processing Firmware performs most of the functionality of the ICE 20 in the area of tracing execution and break cause recognition. CPF 24 comprises processing logic executed by Control Processor (CP) 22. CPF 24 also controls printing of information and controls bus event recognizers which control commands entered into the ICE 20.

The Control Processor (CP) 22 also sends messages to the Pass Through Monitor (PTM) 29 software executed by the target system 34 during ICEMODE operation. ICEMODE is a state of ICE 20 when the target microprocessor 34 allows the non-restricted access to all its internal registers. The CP 22 also monitors the target processor 34 and saves most of the system state variables during emulation. The processing logic embodied in CPF 24 is described in detail below in connection with FIGS. 4a and 4b.

ICE 20 also contains dual ported Random Access Memory (RAM) 28 used for storage of both CPF 24 and PTM 29 firmware. RAM 28 also stores all the variables shared by the CPF 24 and PTM 29. RAM 28 is coupled to CP 22 via address and data bus 46. CP 22 loads and executes CPF 24 and loads PTM 29 firmware to RAM 28.

PTM 29 is executed by the target processor 34 only during ICEMODE. After each ICE 20 reset, PTM 29 code is loaded into RAM 28 by the CP 22 and target processor 34 executes the code. The PTM 29 acts as a slave to the CP 22 although it can function independently of the CP 22.

The In-Circuit Emulator Probe (ICEP) 30 is also shown in FIG. 2. ICEP 30 comprises of a target microprocessor (i.e. target microprocessor system) 34 which is the processor that the ICE 20 emulates. In the preferred embodiment, an i486SL™ brand microprocessor brand CPU is used. Target microprocessor 34 is coupled to internal bus 36 and address and data bus 40. Internal bus 36 is used for routing control signals to and from the target microprocessor 34 and the ICE 20 via Autobreak logic 32. Address and data bus 40 couples the microprocessor 34 to with ICE 20.

Also coupled to the internal bus 36 is Autobreak logic 32. Autobreak logic 32 comprises the logic for enabling the ICEP 30 to break in and out of emulation at any point during a test execution. ICEP 30 is coupled to ICE 20 via address and data bus 40 and control bus 42. These buses allow ICEP 30 to communicate with ICE 20.

Figure 3:
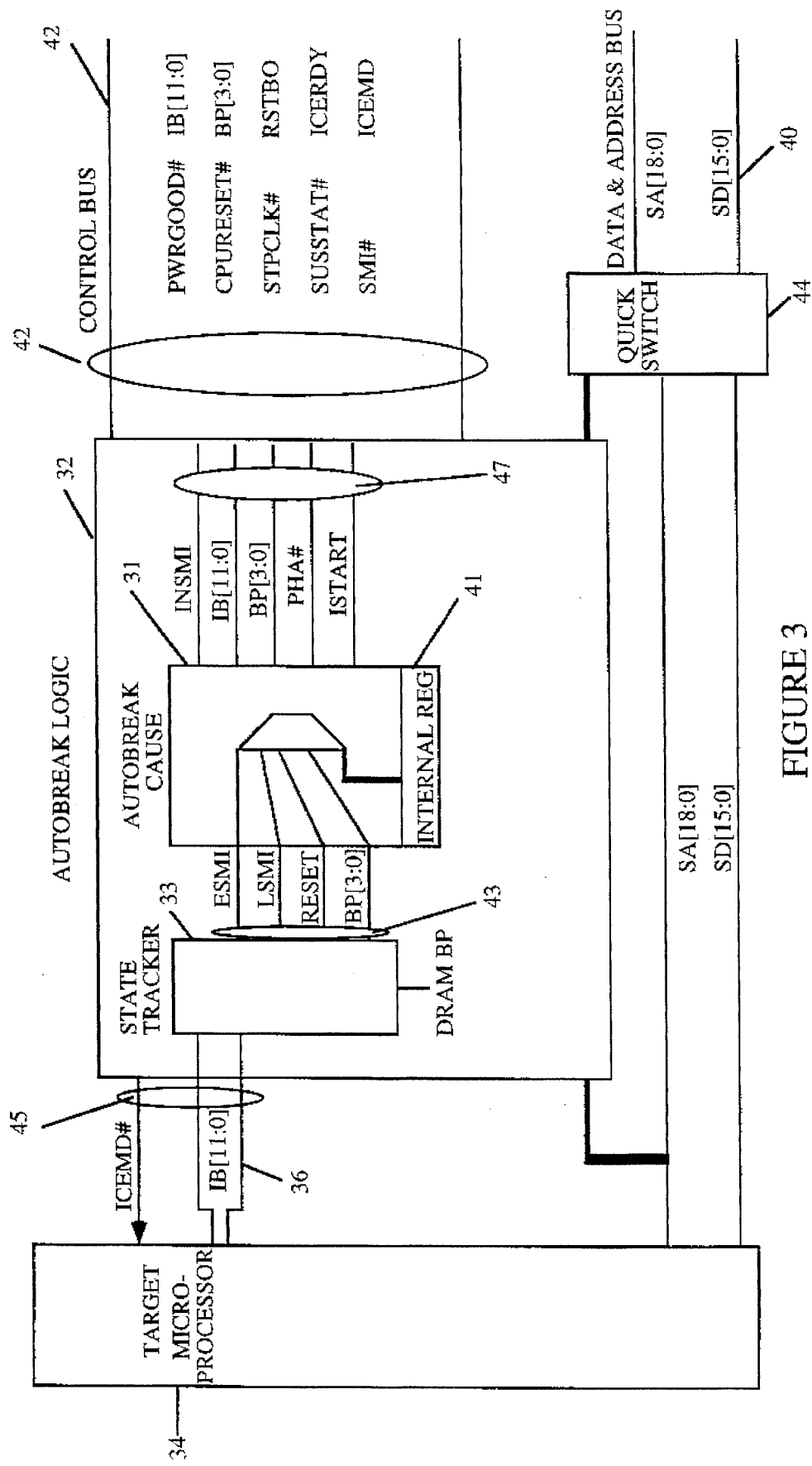
FIG. 3 is a detailed block diagram of the preferred embodiment of the In-Circuit Emulator Probe.

Referring now to FIG. 3, a detailed diagram illustrates the Autobreak logic 32 of the ICEP 30. Autobreak logic 32 comprises Autobreak Cause logic 31 which includes logic for capturing information at various stages of emulation, logic for breaking on specific memory locations, and logic for accessing certain registers in the target microprocessor 34. Autobreak Cause logic 31 also has internal registers 41 which are used for storing message signals sent to it.

Autobreak logic 32 includes a state tracker 33 which transmits signals from the target microprocessor 34 to the Autobreak Cause logic 31. The Autobreak logic 32 provides a method of breaking on special conditions such as resets, exiting and entry into SMM as described below.

In the case of a target microprocessor like the Intel i486SL~ brand microprocessor, special encoded messages are provided by the target microprocessor 34 on the internal bus 36. These messages indicate execution state, branch conditions, SMM entry or exit conditions, and instruction byte counts. These messages are well known to those of ordinary skill in the art. The messages of the present invention use bits 7:0 on internal bus 36. Bits 7:5 of internal bus 36 indicates a SMM activity. SMM entry is indicated when the bit count equals binary 111 and SMM exit when the count equals binary 110.

These messages on internal bus 36 enter the state tracker 33 as illustrated in FIG. 3 where they are decoded into the following signals: (1) Enter System Management Interrupt (ESMI) which signals the entry of the target microprocessor 34 into System Management Mode (SMM); (2) Leave System Management Interrupt (LSMI) which signals the exit of target microprocessor 34 from system management mode; (3) Reset signal (RESET) which gets asserted anytime the target microprocessor 34 is reset for any reason; and (4) Break Point (BP) lines that signal when a breakpoint has occurred in the target microprocessor 34. These signals are output from State tracker 33 on lines 43.

The Break Point (BP) lines are asserted if a debug register shows that a BP has occurred. These debug registers are internally located in the target microprocessor 34. The signals 43 transmitted by the state tracker 33 are compared by Autobreak cause logic 31 to the value stored in the internal register 41. Internal register 41 is a comparator that enables SMM activity by comparing signals entering the AutoBreak Cause 31 to those exiting. If the signal state received from the state tracker 33 matches the corresponding state in the internal register 41, the ICEP 30 will break into ICEMODE.

If the signal states on line 43 do not match internal registers 41, the processor 34 continues emulation. This functionality allows the target processor 34 to break, emulate through conditions or perform a fast break where the processor breaks from emulation long enough for a necessary task to be performed before entering emulation again.

Still referring to FIG. 3, Quick Switch 44 isolates the ICE 20 address and data bus 40 from the target processor's 34 address and data bus. Signals on the control bus 42, synchronizes the ICE 20 with the target processor 34.

Figure 4A:
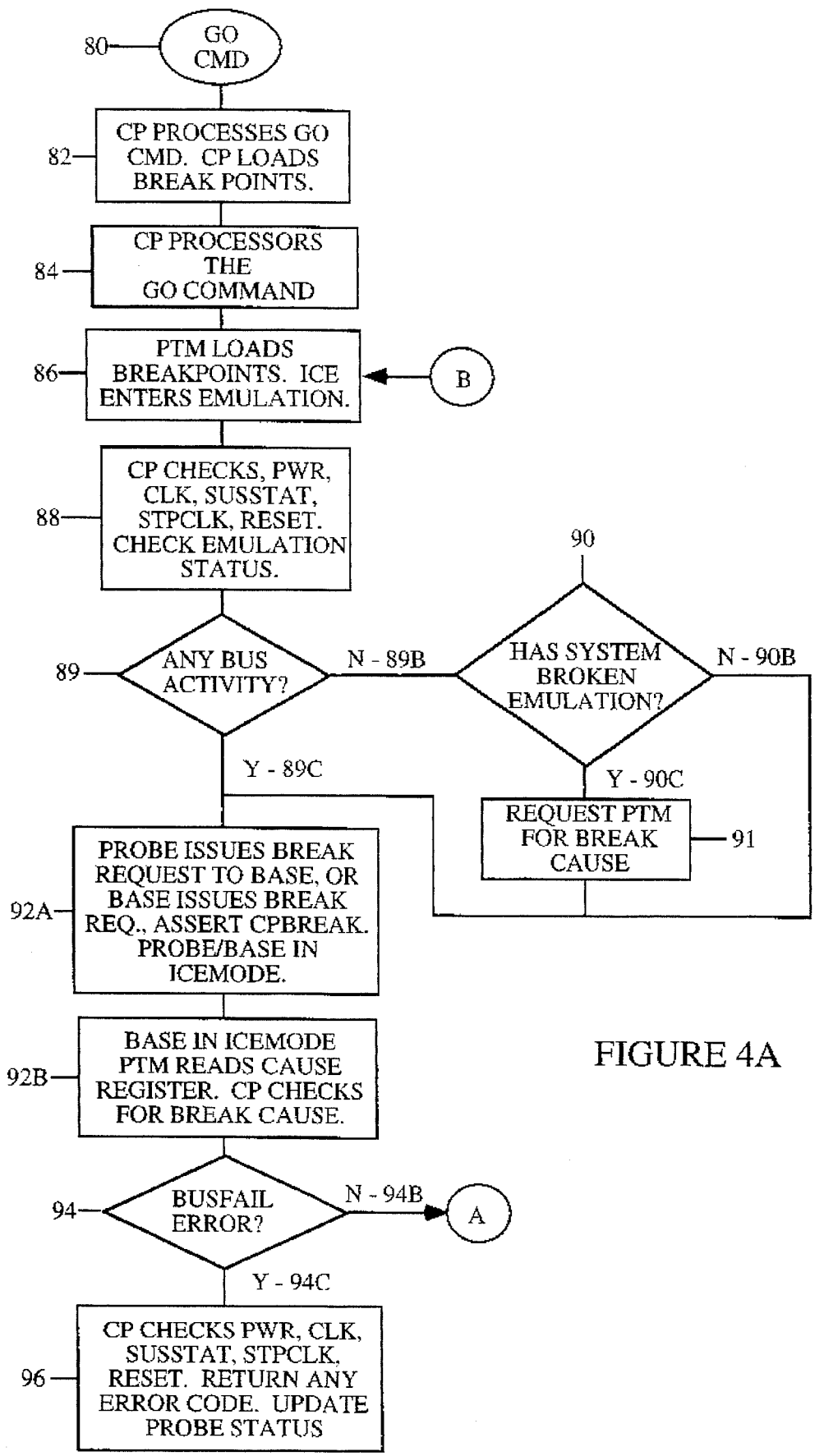
FIGS. 4a and 4b are flowcharts of the processing logic of the preferred embodiment of the present invention.
Figure 4B:
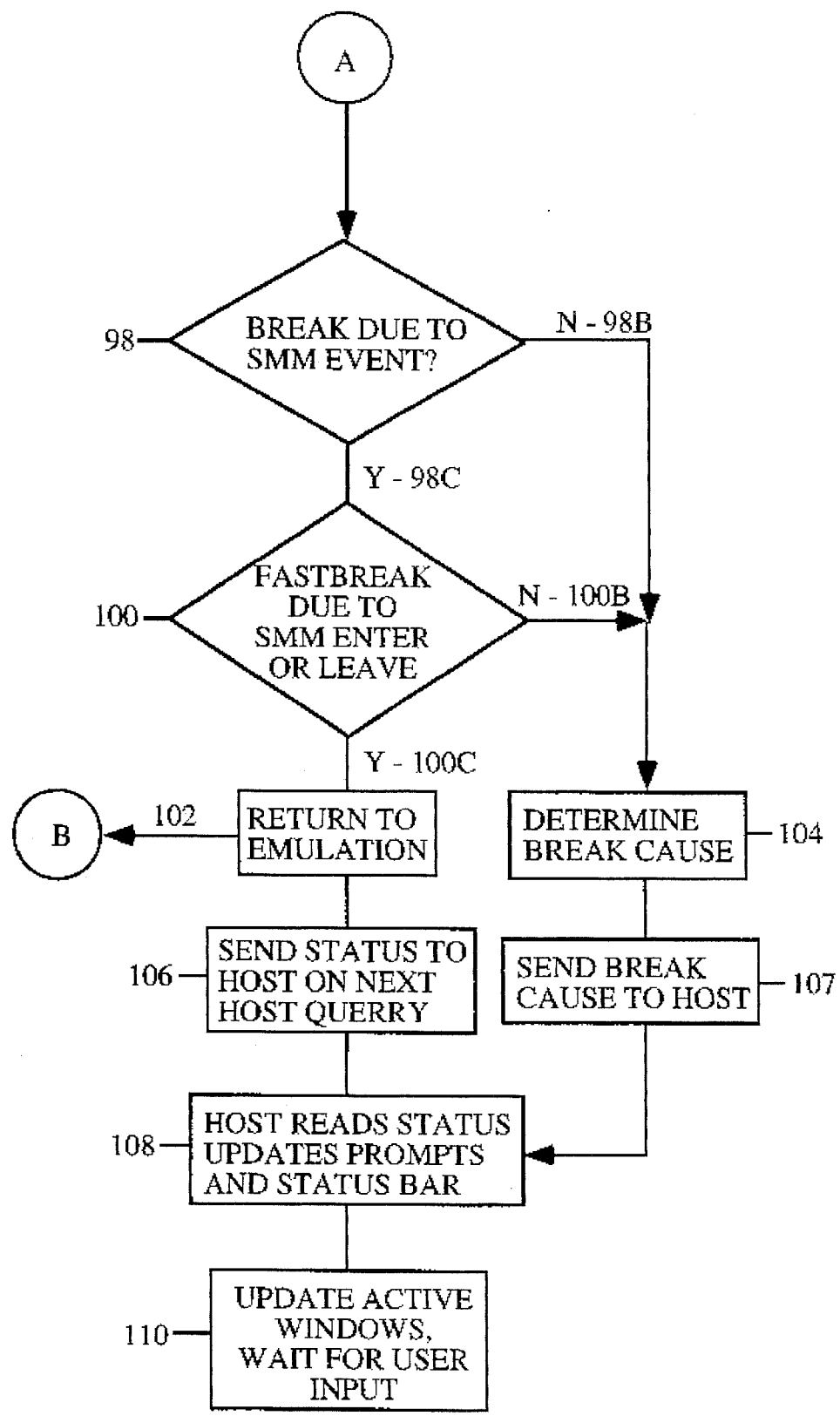

Referring to FIG. 4a and 4b, a flow diagram illustrates how the preferred embodiment operates. At block 80, a user of the present invention enters a GO command at an input device coupled to the host computer 10.

At block 82, the host computer 10 software sends a message to the Control Processor (CP) 22 indicating that the GO command has been issued. The CP 22 then processes the GO command by loading the internal break point registers (not shown) in FIG. 2.

At block 84, the CP 22 also processes the GO command by loading various internal control registers 31 (not shown) in FIG. 2. The CP 22 then sends a message to the PTM 29 via address and data bus 46. PTM 29 loads the BP registers which are internal to microprocessor 34 and starts emulating the target microprocessor system 34 under test.

At block 86, the PTM 29 sets the actual debug registers contents, also internal to target microprocessor 34, loads the software break point registers, does the actual reading and writing to user's system memory (not shown) during loading, disassembles the machine instructions to human readable form and puts the target microprocessor system 34 into emulation mode using the user's code. All these functions performed in block 86 are well documented in the prior art.

At block 88, the CP 22 runs a series of checks to see if there is any activity on the system bus 40 shown in FIG. 3. These include a check to see if the target microprocessor 34 has any power through the power detection logic in the ICE 20, whether the user's clock is active, or the target microprocessor 34 was in suspend mode (#susstat active). The CP 22 at this point also checks to see if the stopclock(#stpclk) signal is asserted and also checks the emulation state of the target microprocessor 34. The stopclock signal is a path from the target microprocessor to the ICE 20 base. ICEP 30 provides this signal to the ICE 20 and through the use of other registers (control and status registers not shown), the emulation state of the target microprocessor 34 can be determined (i.e if there is a bus hang, a processor is halted, or if the processor is suspended in SMM).

At block 89, if the CP 22 does not detect any system bus activity in the target system 34, decision block 90 is executed. If the CP 22 detects any activity on the system bus, block 92A is executed. The activity detection is done by the hardware circuitry on CPB 21.

At block 90, if the CP 22 detects no activity on the system bus, the target microprocessor 34 is checked to see if it has broken out of emulation by monitoring CP 22 status registers. If the target system has broken out of emulation, then block 91 is executed. If the target microprocessor 34 has not broken out of emulation, then block 92A is executed.

At block 91, the CP 22 has determined there is no bus activity on the target system 34 and the target system 34 has broken out of emulation. In this case, the CP 22 requests the PTM 29 for the break cause after checking for CP 22 caused break types, which may include system resets, SMM exits and entries.

At block 92A, the ICEP 30 issues a break request to the target microprocessor 34 under test. If a break condition is met or a user enters a halt command at an input device attached to host computer 10. During this phase, the bondout processor (target system) 34 issues a break request on the internal bus 36 to the Autobreak logic unit 32, which when detected causes the ICEP 30 to break out of emulation. The ICEP 30 at this point gets a shared flag from the internal memory of CP 22. This is a specific signal that the target microprocessor 34 uses to notify CP 22 of an operating mode. The ICEP 30 then goes into ICEMODE and determines the break cause by reading the ICEP 30 internal registers and waits for further instructions from the CP 22.

At decision block 92B, the target microprocessor 34 enters ICEMODE after receiving the break request from the ICEP 30. Once in ICEMODE, the PTM 29 reads the cause of the break from the ICEP 30 internal registers. The CP 22 also checks for the break cause.

At decision block 94, if the CP 22 checks for a busfail error and if a bus failure has occurred then block 96 is executed. However, if the CP 22 does not detect a busfail error, then it continues executing in ICEMODE and goes to block 98 as illustrated in FIG. 4B.

At block 96, if the CP 22 detects a busfail error, it checks to see whether the user's clock is asserted, suspend mode signal is asserted or whether stopclock signal is also asserted. If there is any error with these signals, the CP 22 returns the error code and updates the probe status to the user. This allows the user to debug the target microprocessor 34 while still in emulation.

Referring to FIG. 4B, at decision block 98 the CP 22 checks to see if a break out of emulation was due to an SMM event by asking PTM 29 to send the break cause. If the break was due to an SMM event, then decision block 100 is executed or else block 104 is executed.

At decision block 100, the break cause is examined to determine if it was due to the entry or exit of SMM in a fastbreak condition which occurs when the ICEP 30 loads up its internal register 41 in between the entry and exit of SMM. If the target microprocessor 34 detects this, a break automatically occurs. If this is the case, then the system returns to emulation at block 102. However, if the test at both decision blocks 98 and 100 fail, the break cause is determined at block 104 and the result sent to the host computer 10 at block 107.

At block 102, after the target microprocessor 34 returns to emulation, the results of the break cause from decision blocks 98 and 100 are discarded. Emulator status is sent to the host computer 10 on its next query of the ICE 20.

At block 104, a determination is made of the break cause by CP 22 checking its internal registers and asking PTM 29 for break cause. If the ICE 20 breaks out of emulation was not due to an SMM event, the result is sent to the host computer 10 at block 107.

At block 106, if the target microprocessor 34 breaks out of emulation at decision blocks 98 and 100 are due to an SMM event, the target CPU 34 enters into emulation at block 102. Status information is sent to the host computer 10 on its next query of the ICE 20.

At block 108, the host computer 10 reads the emulator and probe status and then updates any prompts or queries from the user. This status information may include information on power, clock, busfail, stopclock and SMM activities. It also updates the status bar a graphical representation of ICE 20 activities on the display monitor of the host computer 10.

At block 110, the host computer 10 updates its active display windows and waits for user inputs from the input device coupled to host computer (not shown in FIG. 1).

In the foregoing specification, the invention has been described with reference to specific exemplary embodiments thereof. It will, however, be evident that various modifications and changes may be made to the invention without departing from the broader spirit and scope of the invention as set forth in the following claims. The specification and drawings are accordingly to be regarded as an illustrative, rather than in a restrictive sense.

What is claimed is:

1. An apparatus for emulating a computer system through system management mode, said apparatus comprising:
   (a) an in-circuit emulator for emulating said computer system;
   (b) an in-circuit emulation probe coupled to said in-circuit emulator for probing a target microprocessor coupled to said probe while said target microprocessor is being emulated in said system management mode;
   (c) a detection logic circuit coupled to said probe for detecting when said target microprocessor enters or exits said system management mode;
   (d) indicating logic for indicating that said target microprocessor is suspended in a system management mode if said detection logic detects that said target microprocessor has entered system management mode; and
   (e) a break logic circuit coupled to said probe for enabling said probe break in and out of emulation at any point during said emulation of said target microprocessor in said system management mode.

2. The apparatus of claim 1, wherein said break logic further includes a power detection logic for monitoring control signals to and from said target microprocessor during said emulation in said system management mode.

3. The apparatus of claim 2, wherein said control signal include include a stopclock signal "#stopclk" which is asserted to stop emulating said target microprocessor in said system management mode, and a suspend "#susstat" signal which is asserted to temporarily suspend said target microprocessor emulation in said system management mode.

4. The apparatus of claim 1, wherein said break logic circuit includes a break cause logic circuit for capturing and analyzing various states of said system management mode during said emulation of said target microprocessor, said break logic circuit also decodes said captured states of said system management mode into system management mode interrupt signals.

5. The apparatus of claim 1, wherein said break logic further includes a state tracker for transmitting signals from said target microprocessor to said break cause logic circuit in response to special break conditions in said system management mode.

6. In a computer and in-circuit emulation system, having a host computer for processing data and instructions between said host computer and an in-circuit emulator while in a system management mode, wherein said computer system is placed in a reduced power consumption state, said computer system comprising;
   (a) a source microprocessor means for processing data and instructions in said host computer, said microprocessor coupled to a communication bus;
   (b) an in-circuit emulation means coupled to said host computer for emulating a target microprocessor that corresponds to said source microprocessor means in said system management mode, said in-circuit emulation means including means for receiving an enter system management mode signal and an exit system management mode signal from said target microprocessor, said in-circuit emulation means further including means for indicating that said target microprocessor is suspended in a system management mode if said enter system management mode signal is received; and
   (c) an in-circuit emulation probe means coupled to said in-circuit emulation means for probing said target microprocessor while said target microprocessor is being emulated in said system management mode.

7. The computer system of claim 6, wherein said in-circuit emulation probe means includes a detection logic circuit means for detecting various states of said system management mode while probing said target microprocessor.

8. The computer system of claim 6, wherein said in-circuit emulation means further includes a monitoring logic circuitry means for monitoring system bus activity in said host computer and said in-circuit emulation probe means upon entering said system management mode.

9. The computer system of claim 6, wherein said in-circuit emulation means further includes an in-circuit emulation mode "ICEMODE" logic means for allowing a non-restricted access to said target microprocessor's internal registers during emulation in said system management mode.

* * * * *